(12) United States Patent
Kitahara et al.

(10) Patent No.: US 12,242,688 B2
(45) Date of Patent: Mar. 4, 2025

(54) ELECTRONIC DEVICE, INTEGRATED CIRCUIT, AND INPUT SYSTEM

(71) Applicant: Wacom Co., Ltd., Saitama (JP)

(72) Inventors: Noriyuki Kitahara, Saitama (JP); Yuhi Hatano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/438,246

(22) Filed: Feb. 9, 2024

(65) Prior Publication Data
US 2024/0281084 A1    Aug. 22, 2024

(30) Foreign Application Priority Data

Feb. 16, 2023  (JP) ................. 2023-022776

(51) Int. Cl.
*G06F 3/041*  (2006.01)
*G06F 3/0354*  (2013.01)
*G06F 3/044*  (2006.01)

(52) U.S. Cl.
CPC ........ *G06F 3/0416* (2013.01); *G06F 3/03545* (2013.01); *G06F 3/044* (2013.01)

(58) Field of Classification Search
CPC .... G06F 3/03545; G06F 3/0442; G06F 3/044; G06F 3/04162; G06F 3/0446; G06F 3/0416; G06F 2203/04105
See application file for complete search history.

(56) References Cited

U.S. PATENT DOCUMENTS

| | | | |
|---|---|---|---|
| 10,379,672 B2 * | 8/2019 | Zhong | G06F 3/0446 |
| 10,671,206 B1 * | 6/2020 | Lin | H10K 77/111 |
| 10,739,863 B2 * | 8/2020 | Wang | G06F 1/1626 |
| 10,963,095 B1 * | 3/2021 | Dedhia | G06F 3/04166 |
| 11,047,749 B2 * | 6/2021 | Mori | H10N 30/857 |
| 12,008,199 B2 * | 6/2024 | Kim | G06F 3/04166 |
| 12,026,344 B2 * | 7/2024 | Mandziy | G06F 3/0446 |
| 12,073,046 B2 * | 8/2024 | Nomura | G06F 3/0441 |
| 12,093,487 B2 * | 9/2024 | Utsugi | G06F 3/0442 |
| 12,095,453 B2 * | 9/2024 | Hourne | H03K 17/955 |
| 2018/0181255 A1 | 6/2018 | Nomura et al. | |
| 2019/0155347 A1 * | 5/2019 | Ishii | G06F 1/206 |
| 2023/0229257 A1 * | 7/2023 | Henmi | G06F 3/044 345/173 |
| 2023/0409143 A1 * | 12/2023 | Nomura | G06F 3/0446 |
| 2024/0211071 A1 * | 6/2024 | Nomura | G06F 3/0446 |
| 2024/0211079 A1 * | 6/2024 | Moriyama | G06F 3/04186 |

FOREIGN PATENT DOCUMENTS

WO    WO 2017046865 A1    3/2017

* cited by examiner

*Primary Examiner* — Vinh T Lam
(74) *Attorney, Agent, or Firm* — Seed IP Law Group LLP

(57) ABSTRACT

Provided is an electronic device including a display panel that, in operation, displays an image or video, a touch sensor of a capacitive type and having a plurality of sensor electrodes, the touch sensor being arranged above the display panel separately with a gap between the touch sensor and the display panel, and an integrated circuit that, in operation, acquires a signal distribution correlated with a capacitance formed between an indicator approaching the touch sensor and the sensor electrodes, and performs signal processing on the signal distribution to detect the indicator, in which the integrated circuit, in operation, varies the signal processing according to a detection result of an overload on the touch sensor.

14 Claims, 12 Drawing Sheets

FIG.16

| ARTICLE CATEGORY | TYPE | THRESHOLD VALUE |
|---|---|---|
| ELECTRONIC PEN | X1 | Th11 |
| ELECTRONIC PEN | X2 | Th12 |
| ELECTRONIC PEN | X3 | Th13 |
| ... | ... | ... |
| PEN TIP | Y1 | Th21 |
| PEN TIP | Y2 | Th22 |
| PEN TIP | Y3 | Th23 |
| ... | ... | ... |
| TABLET | Z1 | Th31 |
| TABLET | Z2 | Th32 |
| TABLET | Z3 | Th33 |

ELECTRONIC DEVICE, INTEGRATED CIRCUIT, AND INPUT SYSTEM

BACKGROUND

Technical Field

The present disclosure relates to an electronic device, an integrated circuit, and an input system.

Description of the Related Art

Conventionally, there has been known an electronic device in which a position sensor for detecting a position indicated by an indicator such as an electronic pen or a finger (hereinafter also referred to as a "touch sensor") is incorporated into a display device having an image display function. An example of a detection method for a touch sensor is a "capacitive type" in which a position indicated by the indicator is detected from a signal distribution indicating a change in capacitance generated between the indicator and sensor electrodes.

WO 2017/046865 A (hereinafter referred to as Patent Document 1) discloses a configuration in which a gap (or an air gap) is provided between a touch panel obtained by bonding a touch sensor to the back surface of a cover made of glass or the like and a display panel. By configuring the touch panel and the display panel as separate modules in this way, there is an advantage that the electronic device can be repaired by replacing the touch panel if the cover is damaged, so that the repair cost can be reduced accordingly, for example.

However, in the device configuration disclosed in Patent Document 1, when a large load is applied from the outside of the touch panel, the touch sensor may be deformed, and the back surface of the touch sensor may approach or come into contact with the front surface of the display panel. As a result, the shape of the signal distribution output from the touch sensor may change before and after the touch sensor is deformed, and the detection result of the indicator may differ.

BRIEF SUMMARY

The present disclosure has been made in view of such a problem, and embodiments of the present disclosure provide a device configuration in which a capacitive type touch sensor and a display panel are spaced apart from each other so as to provide a gap, to provide an electronic device, an integrated circuit, and an input system that can suppress a decrease in detection accuracy of the indicator caused by the deformation of the touch sensor.

The electronic device according to the first aspect of the present disclosure includes a display panel that, in operation, displays an image or video, a touch sensor of a capacitive type and having a plurality of sensor electrodes, wherein the touch sensor is arranged above the display panel separately with a gap between the touch sensor and the display panel, and an integrated circuit that, in operation, acquires a signal distribution correlated with a capacitance formed between an indicator approaching the touch sensor and the sensor electrodes, and performs signal processing on the signal distribution to detect the indicator, in which the integrated circuit varies, in operation, the signal processing according to a detection result of an overload on the touch sensor.

The integrated circuit according to the second aspect of the present disclosure is a circuit integrated into an electronic device, and the electronic device includes a display panel that, in operation, displays an image or video, and a touch sensor of a capacitive type and having a plurality of sensor electrodes and arranged above the display panel separately with a gap between the touch sensor and the display panel, in which the integrated circuit includes at least one processor, and at least one memory storing instructions that, when executed by the at least one processor, cause the integrated circuit to: detect an indicator by acquiring a signal distribution correlated with a capacitance formed between the indicator approaching the touch sensor and the sensor electrodes, perform signal processing on the signal distribution, and vary the signal processing according to a detection result of an overload on the touch sensor.

The input system according to the third aspect of the present disclosure is a system including an electronic pen and an electronic device used together with the electronic pen, and the electronic device includes a display panel that, in operation, displays an image or video, a touch sensor of a capacitive type and having a plurality of sensor electrodes, wherein the touch sensor is arranged above the display panel separately with a gap between the touch sensor and the display panel, and an integrated circuit that, in operation, acquires a signal distribution correlated with a capacitance formed between an electronic pen approaching the touch sensor and the sensor electrodes, and performs signal processing on the signal distribution to detect the electronic pen, in which the integrated circuit, in operation, varies the signal processing according to a detection result of an overload on the touch sensor.

According to the present disclosure, in a device configuration in which a capacitive type touch sensor and a display panel are arranged apart from each other so as to have a gap, a decrease in detection accuracy for the indicator due to deformation of the touch sensor can be suppressed.

BRIEF DESCRIPTION OF THE SEVERAL VIEWS OF THE DRAWINGS

FIG. 16 is a diagram illustrating a third rule for setting the threshold value.

DETAILED DESCRIPTION

Figure 1:
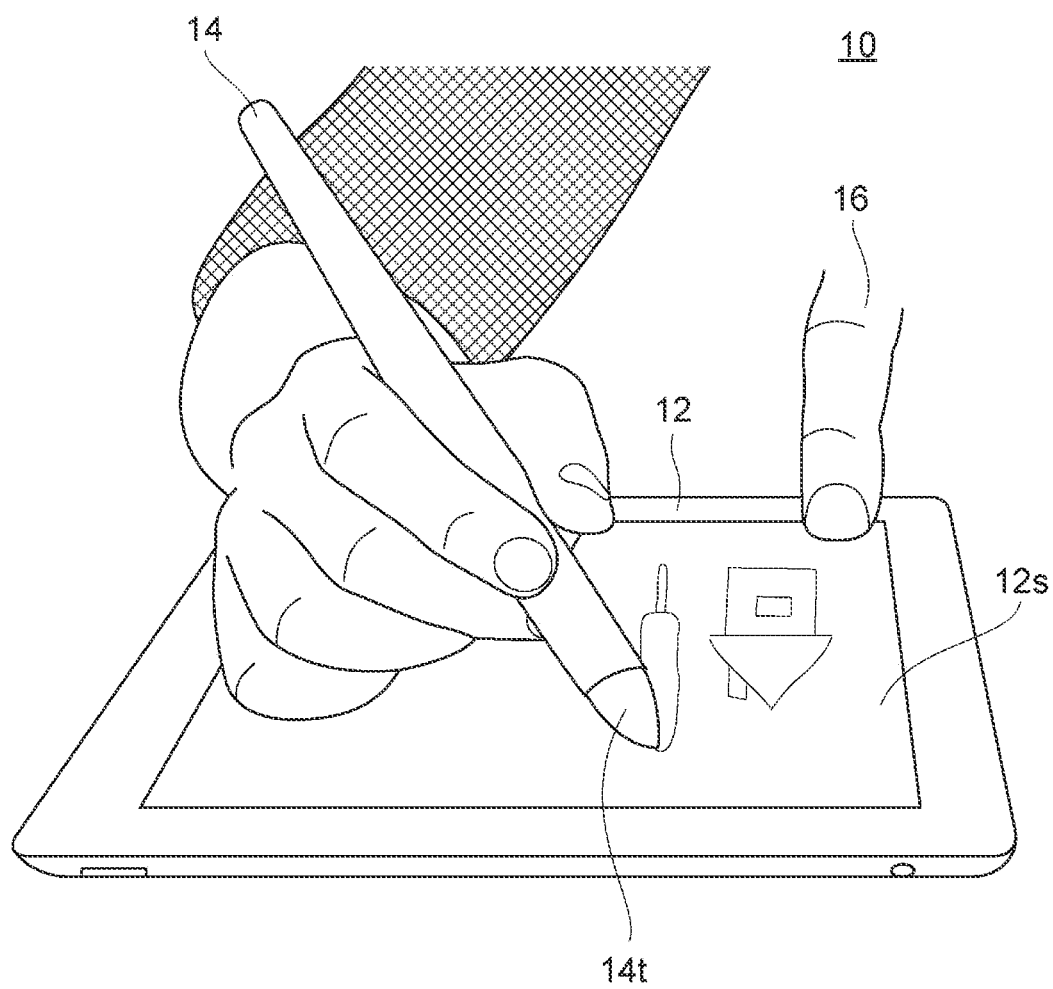
FIG. 1 is an overall configuration diagram of an input system in an embodiment of the present disclosure.

Embodiments of the present disclosure will be described below with reference to the accompanying drawings. In order to facilitate understanding of the description, the same components in respective drawings are denoted by the same reference numerals as much as possible, and redundant description will be omitted.

Configuration of Input System 10

Overall Configuration

FIG. 1 is an overall configuration diagram of an input system 10 according to an embodiment of the present disclosure. This input system 10 basically includes a tablet terminal 12 (corresponding to an "electronic device") and an electronic pen 14 (corresponding to an "indicator").

The tablet terminal 12 is an electronic device having a touch panel display. This electronic device may be a smartphone, personal computer, or wearable terminal in addition to a tablet terminal. The user can write pictures and characters on the tablet terminal 12 by holding the electronic pen 14 with one hand and moving a pen tip 14t while pressing the pen tip 14t against a touch surface 12s of the tablet terminal 12. In addition, the user can perform a desired operation through the user control that is currently displayed, by touching the touch surface 12s with a user's finger 16 (corresponding to the "indicator").

The electronic pen 14 is a pen-shaped pointing device that operates using active capacitance type method (AES), and is also referred to as a stylus. The electronic pen 14 is configured to be able to communicate with the tablet terminal 12 at least through capacitive coupling type communication. A signal transmitted from the tablet terminal 12 to the electronic pen 14 is hereinafter referred to as an "uplink signal," and a signal transmitted from the electronic pen 14 to the tablet terminal 12 is hereinafter referred to as a "downlink signal."

Configuration of Tablet Terminal 12

Figure 2:
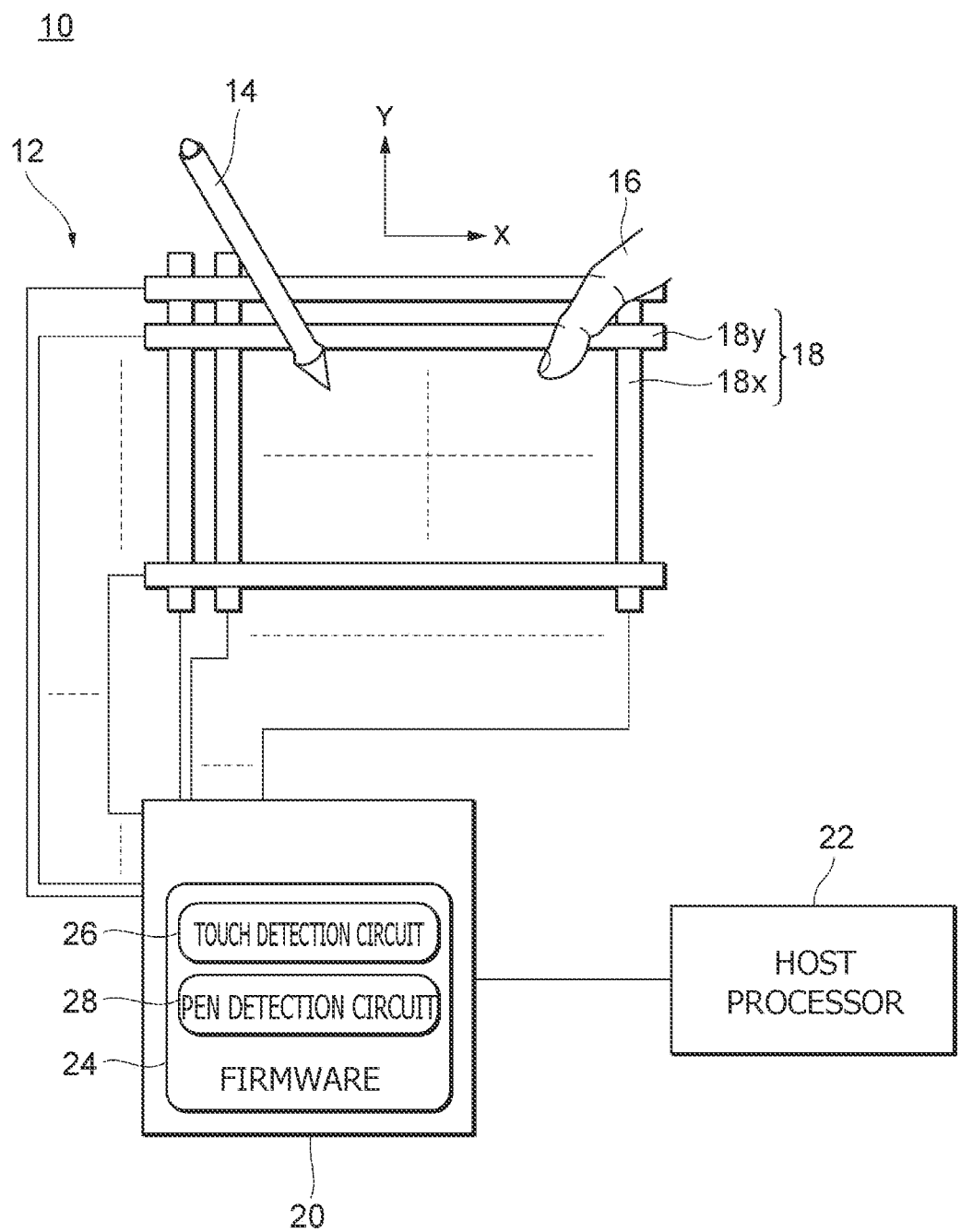
FIG. 2 is a diagram illustrating a schematic configuration of a tablet terminal in FIG. 1.

FIG. 2 is a diagram illustrating a schematic configuration of the tablet terminal 12 in FIG. 1. The tablet terminal 12 includes a touch sensor 18, a touch integrated circuit (IC) (hereinafter referred to as "touch IC 20"), and a host processor 22.

The touch sensor 18 is a capacitive type position sensor formed by combining a plurality of sensor electrodes 18x and 18y in a planar manner. To be specific, the touch sensor 18 includes a plurality of sensor electrodes 18x for detecting a position on the X-axis and a plurality of sensor electrodes 18y for detecting a position on the Y-axis. The X direction and Y direction illustrated in this drawing correspond to the X axis and Y axis of an orthogonal coordinate system defined within the detection area formed by the touch sensor 18. The sensor electrodes 18x and 18y may be made of a transparent conductive material containing indium tin oxide (ITO), or may be made of a wire mesh.

The sensor electrodes 18x are provided, extending in the Y direction and are arranged at regular intervals in the X direction. The sensor electrodes 18y are provided, extending in the X direction and are arranged at regular intervals in the Y direction. Incidentally, the touch sensor 18 may be a self-capacitive sensor in which block-shaped electrodes are arranged in a two-dimensional lattice pattern instead of the above-described mutual capacitive sensor.

The touch IC 20 is an integrated circuit configured to be able to execute a firmware 24, and is connected to each of the plurality of sensor electrodes 18x and 18y that constitute the touch sensor 18. This firmware 24 is configured to be able to implement a touch detection circuit 26 that detects a touch by the user's finger 16, etc., and a pen detection circuit 28 that detects the state of the electronic pen 14. In one or more embodiments, the touch IC 20 includes at least one processor and at least one memory storing instructions that, when executed by the at least one processor, cause the touch IC 20 to perform the functions of the touch detection circuit 26 and the pen detection circuit 28 described herein.

The touch detection circuit 26 includes a function of scanning the touch sensor 18, a function of creating a signal distribution (or heat map) on the touch sensor 18, and a function of classifying areas on the signal distribution (for example, classifying the finger 16 and the palm), for example. The pen detection circuit 28 includes a function of scanning the touch sensor 18 (global scan or sector scan), functions of receiving and analyzing downlink signals, and a function of estimating the state of the electronic pen 14 (for example, position, inclination, writing pressure, etc.), and functions of generating and transmitting uplink signals including commands to the electronic pen 14, for example.

The host processor 22 is an arithmetic processing device including a central processing unit (CPU) or a graphics processing unit (GPU). The host processor 22 reads a program from a memory (not illustrated) and executes the program to perform processing for generating digital ink by using data from the touch IC 20, rendering processing for displaying drawing content indicated by the digital ink, and the like, for example.

Figure 3:
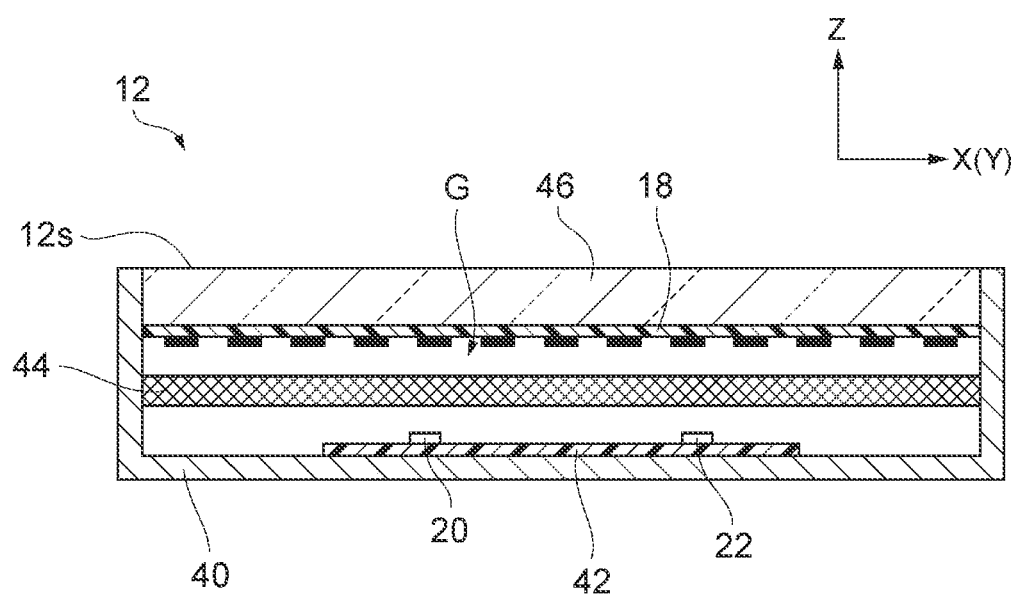
FIG. 3 is a schematic cross-sectional view of the tablet terminal illustrated in FIGS. 1 and 2.

FIG. 3 is a schematic cross-sectional view of the tablet terminal 12 illustrated in FIGS. 1 and 2. The tablet terminal 12 includes a housing 40, a control board 42, a display panel 44, and a protection plate 46 in addition to the touch sensor 18 (FIG. 2) described above.

The housing 40 is a member that houses electronic components in the tablet terminal 12. In the example of FIG. 3, the control board 42, the display panel 44, and the touch sensor 18 are stacked in order from the bottom side to the top side (Z direction) in the housing 40.

The control board 42 is a single board or an assembly of boards that constitutes an electric circuit for operating the tablet terminal 12. As illustrated in FIG. 3, in addition to the touch IC 20 and the host processor 22, various electronic components (not illustrated) are mounted on the control board 42.

The display panel 44 includes a liquid crystal panel, an organic electro luminescence (EL) panel, electronic paper, or the like, for example. The display panel 44 displays images or videos within a display area by applying driving voltages to matrix-shaped signal lines arranged in the row and column directions to drive a plurality of pixels.

The protection plate 46 is a plate made of a translucent material such as glass, and is provided so as to cover the entire surface of the opening that the housing 40 has. The touch sensor 18 is bonded to the back surface of the protection plate 46 via an adhesive layer (not illustrated). As understood from FIG. 3, the touch sensor 18 is spaced apart from and above the display panel 44 so as to provide a gap G therebetween.

Functional Block

Figure 4:
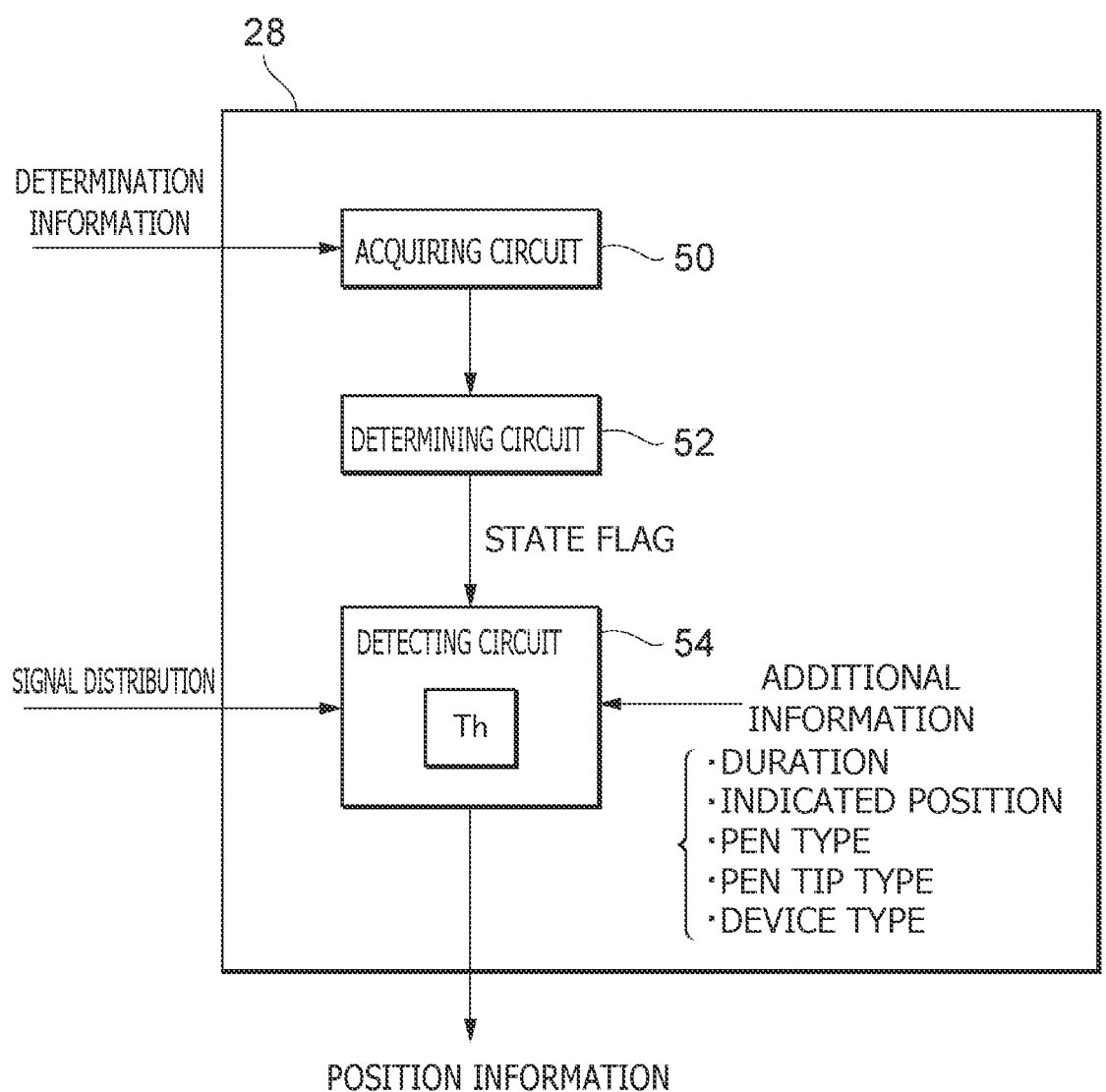
FIG. 4 is a functional block diagram regarding a pen detection circuit of FIG. 1.

FIG. 4 is a functional block diagram regarding the pen detection circuit 28 in FIG. 1. The pen detection circuit 28 includes an acquiring circuit 50, a determining circuit 52, and a detecting circuit 54.

The acquiring circuit 50 acquires information for determining the state of the load applied to the touch sensor 18 (hereinafter also referred to as "determination information"). This determination information includes [1] the writing pressure acting on the pen tip 14t, [2] the pressure acting on the surface of the display panel 44, or [3] the amount of deformation of the touch sensor 18 or the protection plate 46, for example.

The writing pressure is measured by using a writing pressure sensor 60 (FIG. 6) that the electronic pen 14 has, for example. The measured writing pressure is converted into a signal value that correlates with the writing pressure (that is, a writing pressure value), and is output to the tablet terminal 12. In this case, the acquiring circuit 50 uses [1] capacitive coupling type communication with the electronic pen 14, or [2] communication other than the capacitive coupling type communication (wired communication or wireless communication), to acquire the writing pressure value from the electronic pen 14.

The pressure is measured by using a pressure sensor 72 (FIG. 13) placed on the surface of the display panel 44, for example. An example of this sensor method is the "capacitive type," in which the amount of displacement of a diaphragm that deforms in response to changes in pressure is measured as a change in capacitance, and this amount of change is converted into pressure for output thereof. The amount of deformation is measured by using a strain sensor or an optical displacement sensor, for example.

The determining circuit 52 determines the load state on the touch sensor 18 by using the determination information acquired by the acquiring circuit 50, and outputs a determination result indicating the load state. This load state is expressed by [1] qualitative values such as no load, a normal load, an overload, and a non-overload, or [2] quantitative values such as a displacement value, deformation value, and deflection value (unit: mm). The determining circuit 52 may determine that an overload (that is, a load exceeding the upper limit of the allowable range of the writing pressure value) has occurred, [1] when the writing pressure value supplied from the electronic pen 14 is in a saturated state, [2] when the pressure sensor 72 detects pressure from the touch sensor 18, or [3] when the amount of displacement of the touch sensor 18 exceeds a threshold value, for example.

The detecting circuit 54 acquires a signal distribution correlated with the capacitance (here, the capacitance or changes in the capacitance) formed between the indicator approaching the touch sensor 18 (here, the electronic pen 14) and the sensor electrodes 18x and 18y, and performs various types of signal processing on the acquired signal distribution to detect the electronic pen 14. This signal processing includes [1] a "threshold value determination processing" for detecting the presence or absence of the electronic pen 14 from the magnitude relation between the signal value for each position indicated by the signal distribution and a threshold value, or [2] a "position calculation processing" for calculating the indicated position of the electronic pen 14 by performing interpolation calculation or approximation calculation on the signal distribution.

The detecting circuit 54 may vary the threshold value to be used in the threshold value determination processing, depending on the determination result by the determining circuit 52. To be specific, when an overload on the touch sensor 18 is detected, the detecting circuit 54 makes the threshold value smaller than that when no overload is detected. In addition, the signal value used in the threshold value determination processing may be a signal value obtained for each scan of the touch sensor 18 (that is, an instantaneous value), or a value obtained by integrating instantaneous values acquired sequentially within a predetermined period of time (that is, an integrated value). In particular, by using the integrated value instead of the instantaneous value, the influence of noise contained in the detection signal is reduced, and the detection accuracy for the electronic pen 14 is improved accordingly.

Furthermore, the detecting circuit 54 may further use additional information in addition to the determination result by the determining circuit 52 to set the threshold value to be used in the threshold value determination processing. Here, "additional information" corresponds to various types of information that can affect the overall shape or local shape of the signal distribution output from the touch sensor 18. Examples of the additional information include [1] the duration of the overload state, [2] the indicated position of the electronic pen 14, [3] the type of the electronic pen 14, [4] the type of the pen tip 14t, or [5] the type of the tablet terminal 12. The above-mentioned duration is determined through analysis of the determination result by the determining circuit 52. The indicated position described above corresponds to the indicated position of the electronic pen 14 most recently detected by the detecting circuit 54. The type of the electronic pen 14 or the pen tip 14t described above is acquired through a downlink signal from the electronic pen 14. The type of the tablet terminal 12 described above is provided by the host processor 22.

Operation of Input System 10

The input system 10 in the present embodiment is configured as described above. Next, the operation for detecting the electronic pen 14 by the tablet terminal 12 will be described with reference to the flowchart in FIG. 5, and FIGS. 6 to 12.

At Normal Load

Figure 5:
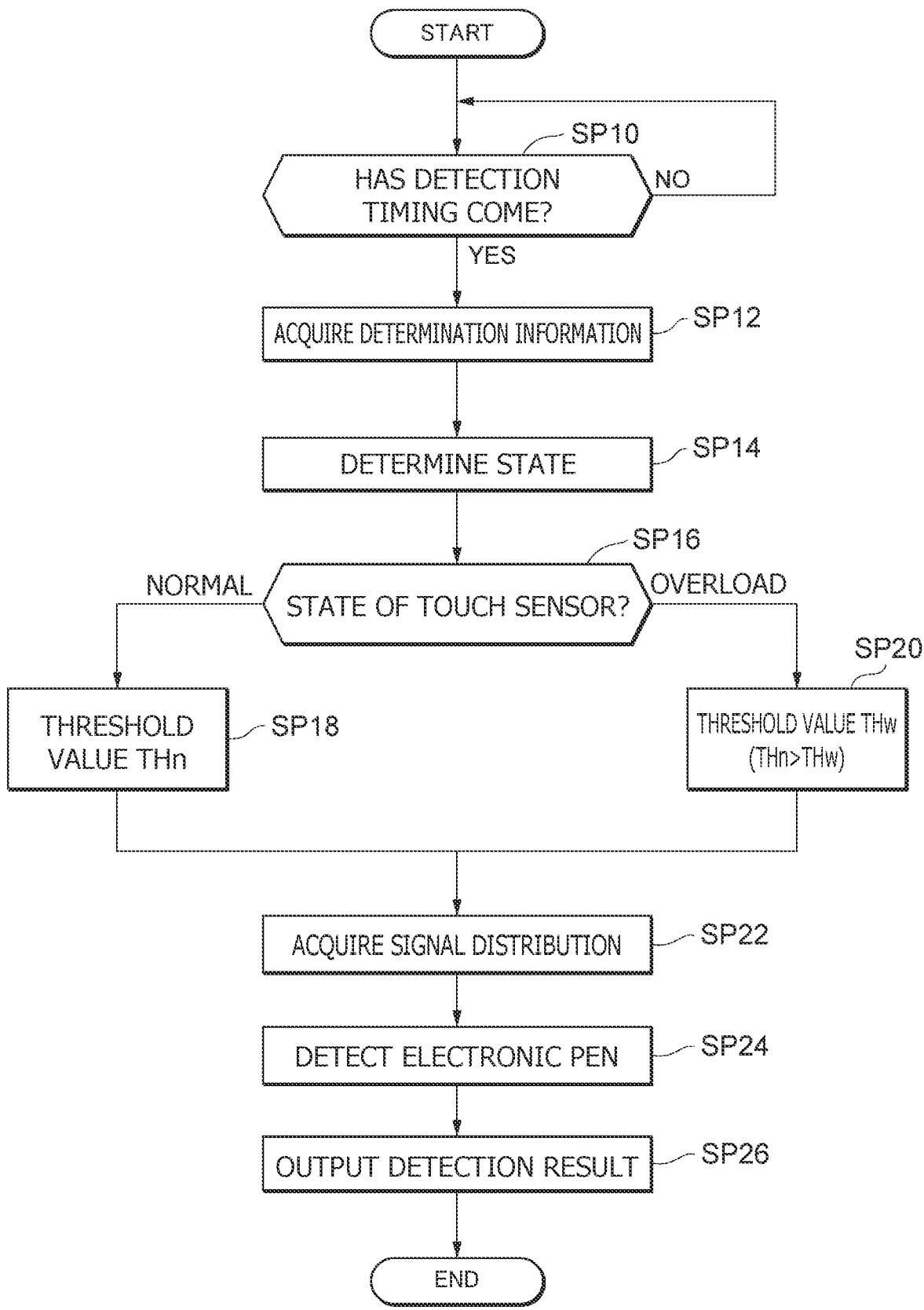
FIG. 5 is a flowchart regarding the operation of the pen detection circuit illustrated in FIG. 1.

At SP10 in FIG. 5, the pen detection circuit 28 of the touch IC 20 checks whether or not the timing for detecting the electronic pen 14 has come. If the detection timing has not yet been reached (SP10: NO), the pen detection circuit 28 remains at SP10 until the detection timing comes. On the other hand, when the detection timing for the electronic pen 14 has come (SP10: YES), the pen detection circuit 28 proceeds to SP12.

At SP12, the pen detection circuit 28 (more specifically, the acquiring circuit 50) acquires information for determining the load state of the touch sensor 18 (namely, determination information). Here, a case where the determination information regards a "writing pressure value" will be explained as an example.

Figure 6:
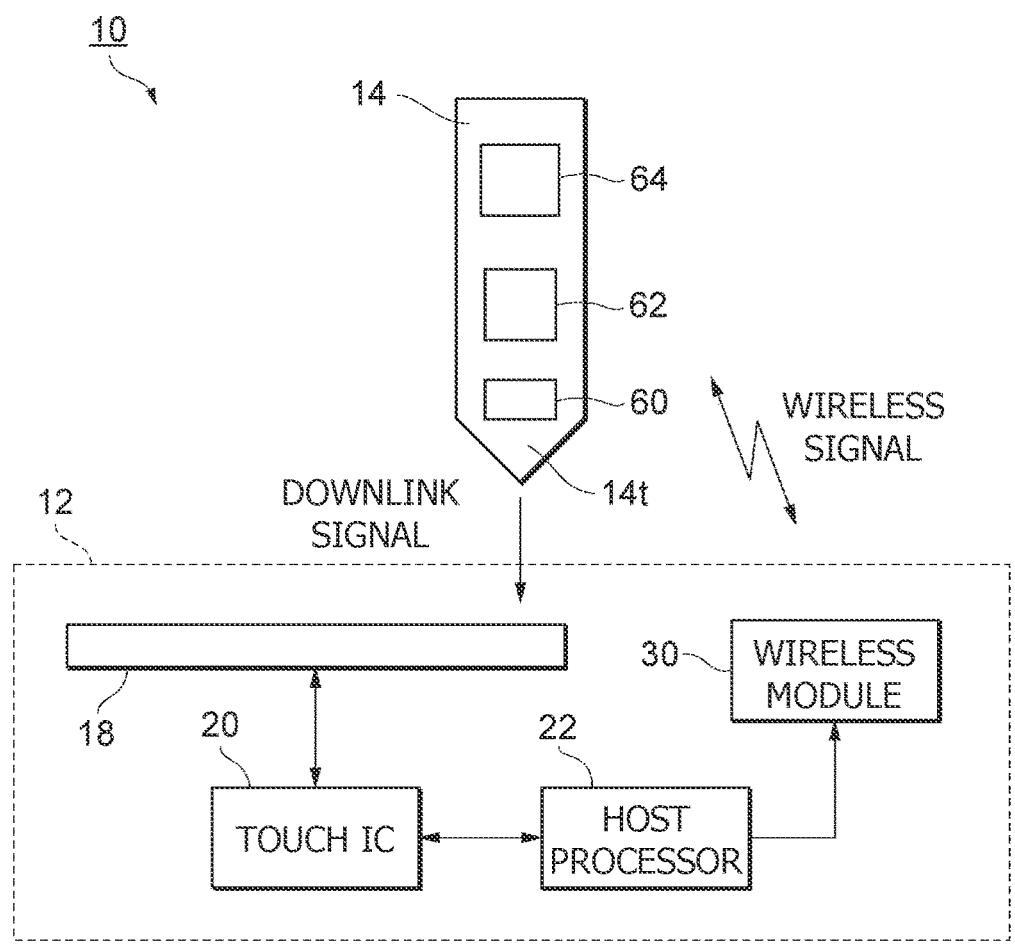
FIG. 6 is a diagram schematically illustrating a method of acquiring a writing pressure value.

FIG. 6 is a diagram schematically illustrating a method of acquiring a writing pressure value. Here, the touch sensor 18, the touch IC 20, the host processor 22, and a wireless module 30 are illustrated as the components of the tablet terminal 12. Further, as the components of the electronic pen 14, the writing pressure sensor 60, a first communication circuit 62, and a second communication circuit 64 are illustrated.

First, the tablet terminal 12 acquires a writing pressure value from the electronic pen 14 through communication using a capacitive coupling method. The first communication circuit 62 of the electronic pen 14 acquires the writing pressure value output from the writing pressure sensor 60, and generates a downlink signal modulated by using data including the writing pressure value, thereby transmitting the downlink signal from the electrode of the pen tip 14t. Thereafter, the touch IC 20 of the tablet terminal 12 receives the downlink signal via the touch sensor 18 and obtains data including the writing pressure value through demodulation of the downlink signal. Thus, the writing pressure value is acquired.

Second, the tablet terminal 12 acquires the writing pressure value from the electronic pen 14 through communication different from the communication using the capacitive coupling method. The second communication circuit 64 of the electronic pen 14 acquires the writing pressure value output from the writing pressure sensor 60, and generates a wireless signal modulated by using data including the writing pressure value, thereby transmitting the wireless signal from an electrode (not illustrated). Thereafter, the touch IC 20 of the tablet terminal 12 receives the wireless signal via the wireless module 30, and acquires data including the writing pressure value through demodulation of the wireless signal. Thus, the writing pressure value is acquired.

At SP14 of FIG. 5, the pen detection circuit 28 (more specifically, the determining circuit 52) uses the determination information (here, writing pressure value) acquired at SP12 to determine the load state of the touch sensor 18. As a result of the determination, a flag indicating the load state of the touch sensor 18 (hereinafter referred to as a state flag) is output. For example, this state flag takes a value of "0" at the time of a "normal load" and takes a value of "1" at the time of an "overload."

At SP16, the pen detection circuit 28 (more specifically, the detecting circuit 54) checks the load state of the touch sensor 18 with reference to the determination result at SP14. For example, when the value of the state flag is "0," that is, at the "normal load" state (SP16: normal load), the detecting circuit 54 proceeds to SP18.

At SP18, the detecting circuit 54 sets the threshold value to be used in the threshold value determination processing to "THn," and then proceeds to SP22.

At SP22, the detecting circuit 54 acquires the signal distribution output from the touch sensor 18.

Figure 7:
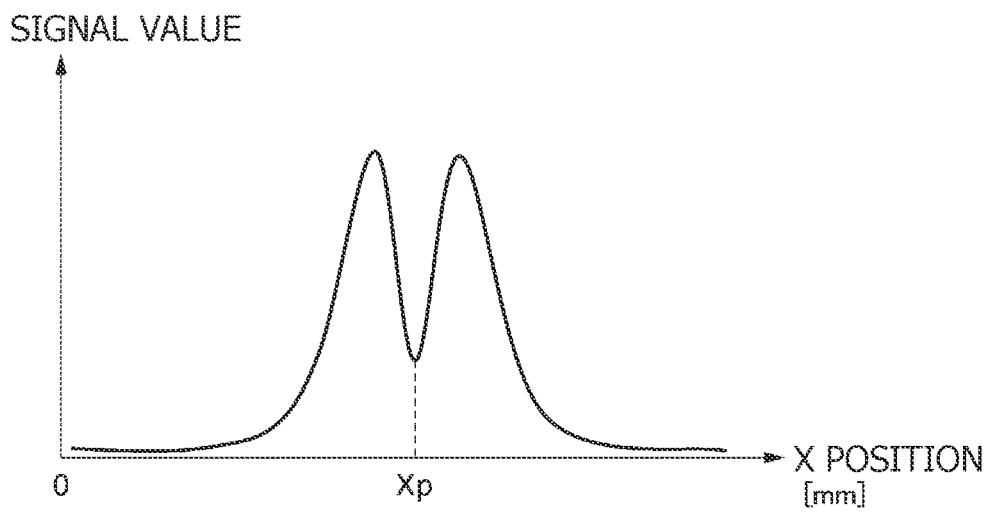
FIG. 7 is a diagram illustrating an example of signal distribution output from a touch sensor.

FIG. 7 is a diagram illustrating an example of the signal distribution output from the touch sensor 18. The horizontal axis of the graph indicates the position (unit: mm) on the X-axis, and the vertical axis of the graph indicates the signal value (unit: dimensionless). In the example illustrated, the signal distribution has two peaks having approximately the same height. The indicated position of the electronic pen 14 corresponds to the position of the valley (Xp) between the two peaks. Note that the shape of the signal distribution is not limited to the example illustrated in FIG. 7, and the number of peaks in the signal distribution may be one depending on the device configuration.

At SP24 of FIG. 5, the detecting circuit 54 detects the presence or absence of the electronic pen 14 or the indicated position by performing signal processing including threshold value determination processing and position calculation processing on the signal distribution acquired at SP22.

Figure 8:
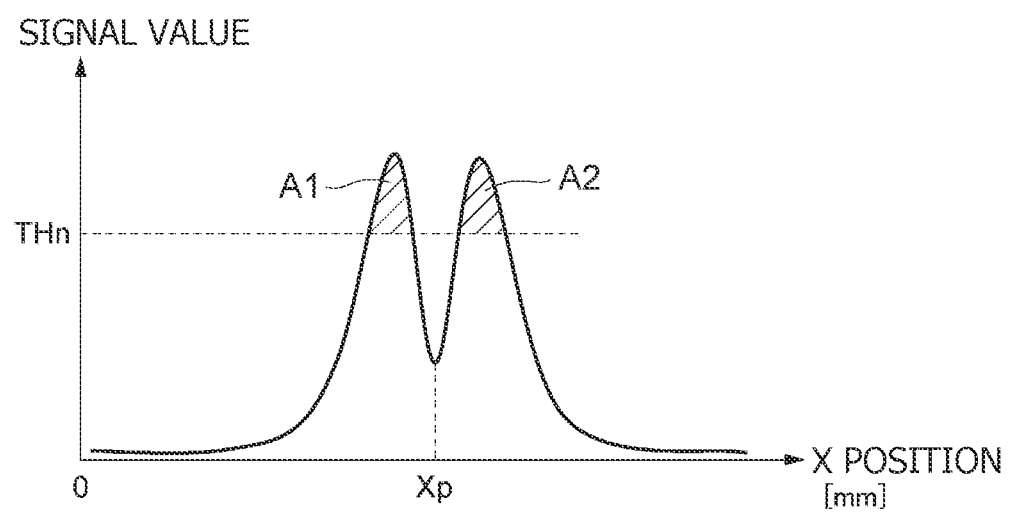
FIG. 8 is a diagram illustrating a result of threshold value determination processing when the touch sensor is under a normal load.

FIG. 8 is a diagram illustrating the results of the threshold value determination processing when the touch sensor 18 is under a normal load. Through this threshold value determination processing, a region where the signal value (specifically, an instantaneous value or an integrated value) is larger than the threshold value THn, specifically, regions A1 and A2 indicating the two peak apexes are extracted. Thereafter, through the position calculation processing, the indicated position Xp of the electronic pen 14 is calculated from the relation between the signal values in the regions A1 and A2 and surrounding positions.

At SP26 in FIG. 5, the detecting circuit 54 outputs the detection result obtained at SP24 to the outside (here, the host processor 22).

Thereafter, the pen detection circuit 28 repeats and executes the flowchart of FIG. 5 regularly or irregularly. While the "normal load" state of the touch sensor 18 continues, the branch of SP16→SP18→SP22 is selected.

During Overload

Next, assume that an overload occurs on the touch sensor 18 due to the user pressing the electronic pen 14 with more force than necessary.

Figure 9:
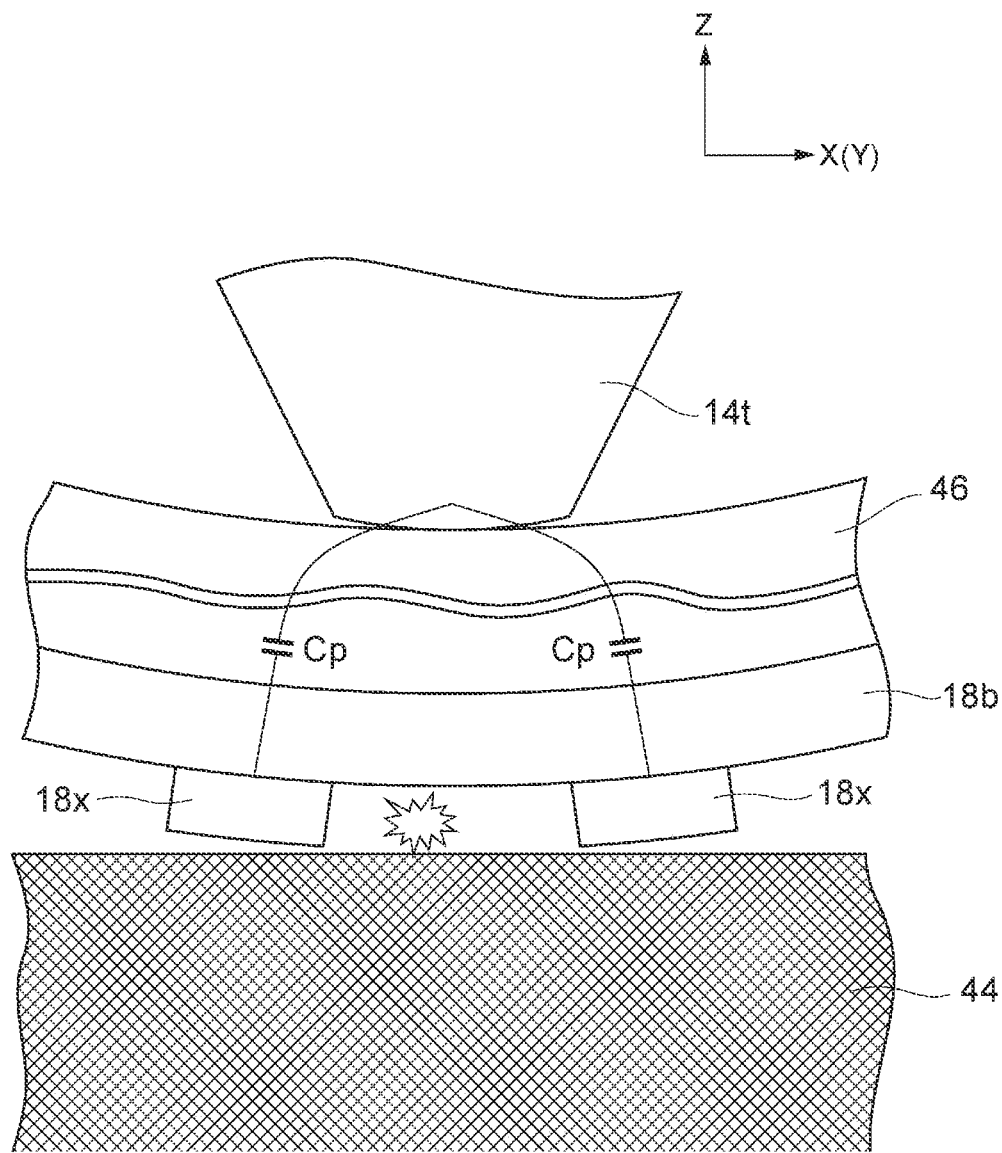
FIG. 9 is a diagram illustrating a cross-sectional shape of the tablet terminal when the touch sensor is overloaded.

FIG. 9 is a diagram illustrating a cross-sectional shape of the tablet terminal 12 when the touch sensor 18 is overloaded. To be more specific, FIG. 9 corresponds to a partially enlarged circuital view of the tablet terminal 12 around the area where an overload occurs. The touch sensor 18 includes a base 18b made of resin containing polyethylene terephthalate, and the plurality of sensor electrodes 18x provided on the lower surface of the base 18b. A capacitance is formed between the pen electrode provided on the pen tip 14t and the sensor electrode 18x positioned near the pen tip 14t.

Since the gap G is provided between the touch sensor 18 and the display panel 44, when the touch sensor 18 is overloaded, the touch sensor 18 and the base 18b are integrally deformed into a downward projecting shape. As the sensor electrode 18x approaches, electrical noise generated from the display panel 44 is incorporated into the capacitance, which makes it easy for noise to be mixed into the signal. In addition, the contact of the sensor electrode 18x causes the charge forming the capacitance to flow out to the display panel 44 side, which tends to lower the signal level.

Figure 10:
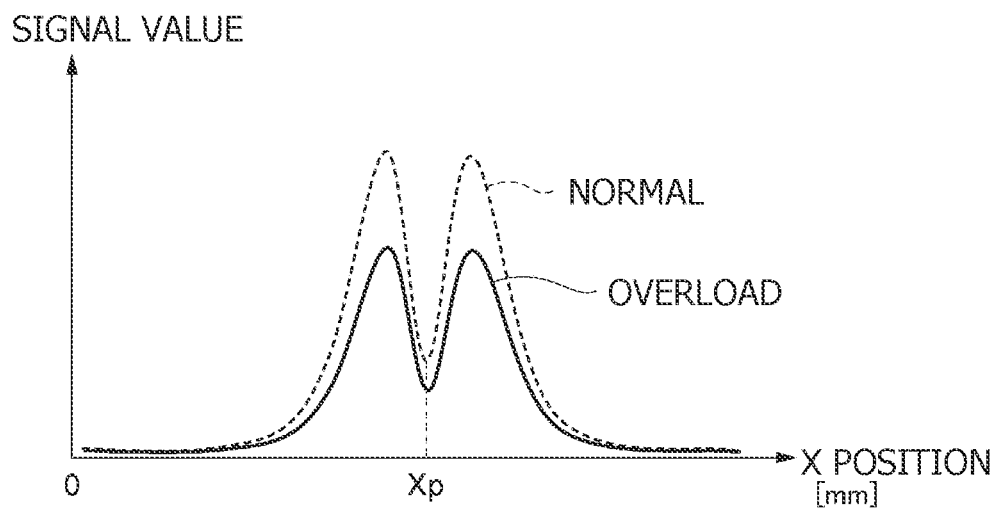
FIG. 10 is a diagram illustrating an example of change in shape of the signal distribution before and after occurrence of an overload.

FIG. 10 is a diagram illustrating an example of a change in the shape of the signal distribution before and after the occurrence of an overload. The definition of this graph is the same as in the case of FIG. 7. As can be understood from FIG. 10, the signal distribution during an overload (indicated by a solid line) has a tendency to maintain a similarity relationship with the signal distribution under a normal load (indicated by a broken line), and to have a tendency of signal values to decrease throughout. Therefore, the pen detection circuit 28 performs the detection processing of the electronic pen 14 while taking into consideration the tendency of the shape of the signal distribution to change.

At SP10 in FIG. 5, the pen detection circuit 28 checks whether or not the detection timing for the electronic pen 14 has come. At SP12, the acquiring circuit 50 acquires a writing pressure value for determining the load state of the touch sensor 18.

Figure 11:
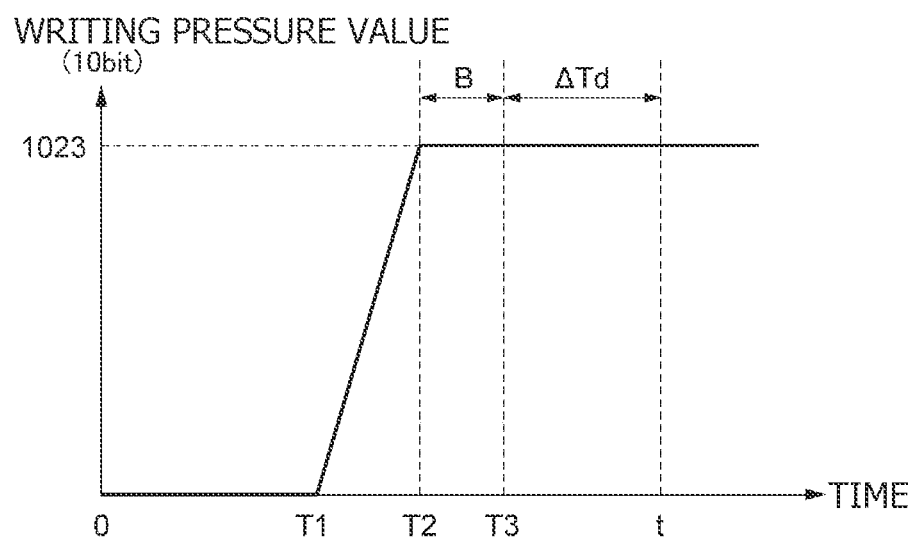
FIG. 11 is a diagram illustrating an example of changes over time in the writing pressure value when the touch sensor is overloaded.

FIG. 11 is a diagram illustrating an example of change over time in writing pressure value when the touch sensor 18 is overloaded. The horizontal axis of the graph indicates time (unit: s), and the vertical axis of the graph indicates the writing pressure value (unit: dimensionless). Here, the 10-bit writing pressure value is defined to be proportional to the writing pressure within the effective range of writing pressure acting on the pen tip 14t.

For example, it is assumed that the user continues to press the pen tip 14t after performing the pen down operation at time t=T1. Then, the writing pressure value increases linearly as time elapses, and reaches the maximum (=1023) at time t=T2. Thereafter, the writing pressure value maintains the maximum value or a value close to the maximum value. For example, when the elapsed time from t=T2 exceeds a time threshold value B, the determining circuit 52 considers that the writing pressure acting on the pen tip 14t is in a saturated state, and detects an "overload" on the touch sensor 18.

At SP16 in FIG. 5, the detecting circuit 54 checks the load state of the touch sensor 18 with reference to the determination result at SP14. For example, when the value of the status flag is "1," that is, at the "overload" state (SP16: overload), the detecting circuit 54 proceeds to SP20 instead of SP18.

At SP20, the detecting circuit 54 sets the threshold value to be used in the threshold value determination processing to "THw," and then proceeds to SP22. Here, it should be noted that the magnitude relation THn>THw is satisfied.

At SP22, the detecting circuit 54 acquires the signal distribution output from the touch sensor 18. When the touch sensor 18 is overloaded, a signal distribution as indicated by the solid line in FIG. 10 is obtained.

At SP24, the detecting circuit 54 detects the presence or absence of the electronic pen 14 or the indicated position by performing signal processing including threshold value determination processing and position calculation processing on the signal distribution acquired at SP22.

Figure 12:
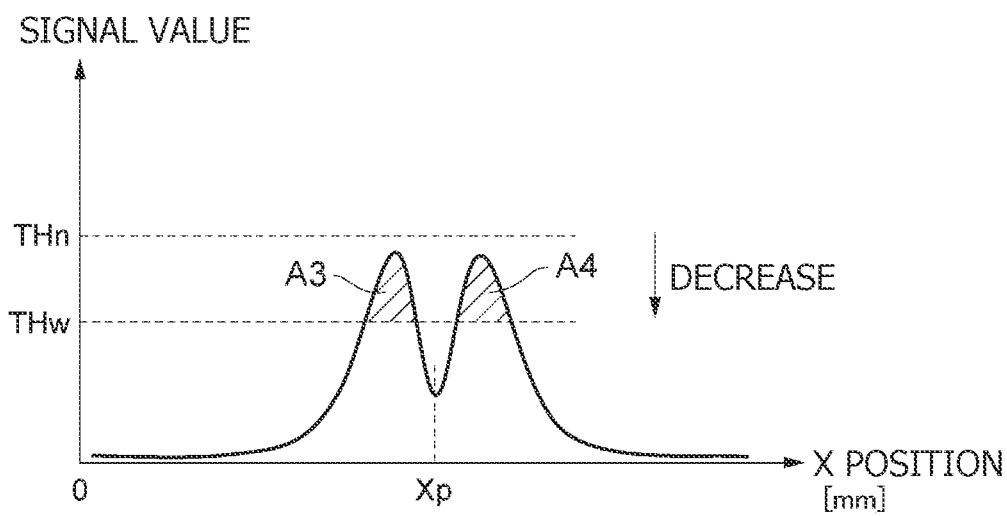
FIG. 12 is a diagram illustrating a result of the threshold value determination processing when the touch sensor is overloaded.

FIG. 12 is a diagram illustrating the result of the threshold value determination processing when the touch sensor 18 is overloaded. Through this threshold value determination processing, regions where the signal value is greater than the threshold value THw, specifically, regions A3 and A4 representing two peak apexes are extracted. After that, through position calculation processing, the indicated position Xp of the electronic pen 14 is calculated from the relation between the signal values in the regions A3 and A4, and the peripheral positions.

At SP26 in FIG. 5, the detecting circuit 54 outputs the detection result obtained at SP24 to the outside (here, the host processor 22).

Thereafter, the pen detection circuit 28 repeats execution according to the flowchart of FIG. 5 regularly or irregularly. While the "overload" state of the touch sensor 18 continues, the branch of SP16→SP20→SP22 is selected. In this way, in the case of an overload, by lowering the threshold value compared to the case of a normal load, it becomes easier to detect the presence or absence of the electronic pen 14 or the indicated position.

Another Example of Threshold Value Determination Processing

Next, another example of the threshold value determination processing will be described with reference to FIGS. 13 to 16.

First Example

The pen detection circuit 28 of the touch IC 20 may determine the load state on the touch sensor 18 by using a physical quantity different from the writing pressure acting on the pen tip 14t of the electronic pen 14.

Figure 13:
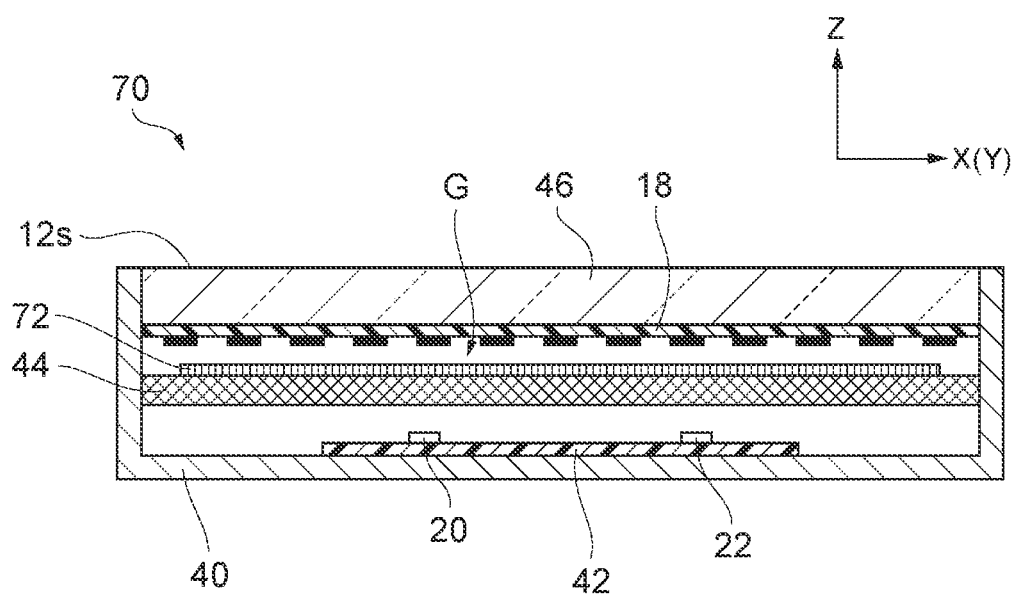
FIG. 13 is a schematic cross-sectional view of a tablet terminal in another configuration example.

FIG. 13 is a cross-sectional view of a tablet terminal 70 in another configuration example. The tablet terminal 70 further includes the pressure sensor 72 in addition to components of the tablet terminal 12 illustrated in FIG. 3. The pressure sensor 72 is provided on the surface of the display panel 44 and connected to the control board 42. An example of this sensor method is a "capacitive type" in which the displacement of the diaphragm is obtained as the amount of change in capacitance, and the amount of change is converted to measure the pressure.

In the case of the device configuration described above, the pen detection circuit 28 of the touch IC 20 can detect the load state on the touch sensor 18 by using the pressure acting on the pressure sensor 72 instead of the writing pressure acting on the pen tip 14t. To be specific, when the pressure sensor 72 does not detect the pressure from the touch sensor 18, the pen detection circuit 28 (more specifically, the determining circuit 52) determines that the load is a "normal load," and on the other hand, when the pressure sensor 72 detects the pressure from the touch sensor 18, the state is determined to be an "overload" state.

According to the first example, by utilizing the fact that pressure is applied to the surface of the display panel 44 due to contact with the touch sensor 18, an overload can be detected without actually measuring the load on the touch sensor 18.

Second Example

When determining that the touch sensor 18 is in an "overload" state, the pen detection circuit 28 of the touch IC 20 may dynamically set the threshold value to be used for threshold value processing according to the duration of the overload. For example, the pen detection circuit 28 may decrease the threshold value continuously or stepwise as the duration becomes longer.

Figure 14:
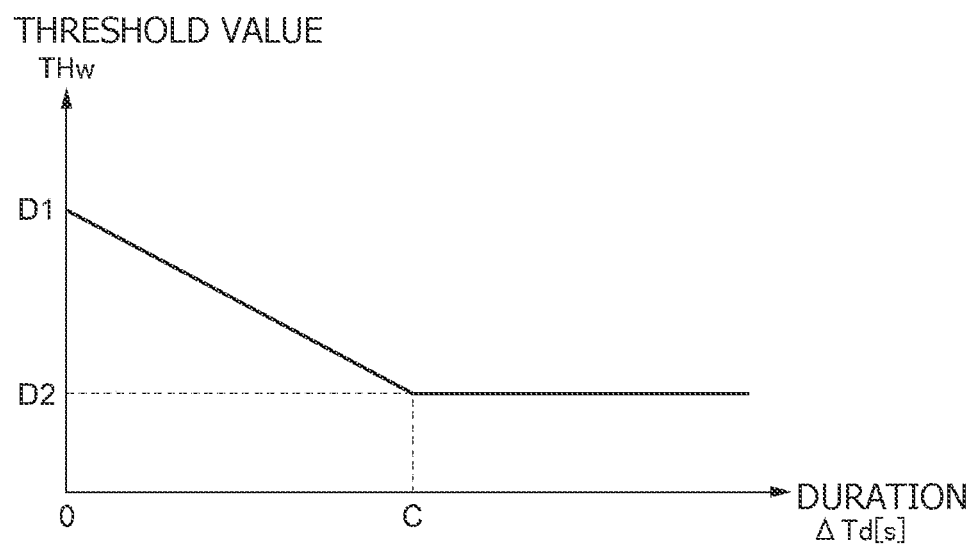
FIG. 14 is a diagram illustrating a first rule for setting a threshold value.

FIG. 14 is a diagram illustrating a first rule for setting threshold values. The horizontal axis of the graph indicates duration of the overload $\Delta Td$ (unit: s), and the vertical axis of the graph indicates the threshold value THw. At the onset of the overload ($\Delta Td=0$), the threshold value is set to THw=D1. Then, the threshold value THw is set so as to linearly decrease as the duration $\Delta Td$ increases. And then, in a range where the duration satisfies $\Delta Td \geq C$, the threshold value is set to a constant value (THw=D2; however, 0<D2<D1).

According to the second example, detection can be performed in consideration of the fact that the signal value tends to decrease as the duration of the overload increases.

Third Example

When determining that the touch sensor 18 is in the "overload" state, the pen detection circuit 28 of the touch IC 20 may dynamically set the threshold value to be used for threshold processing according to the indicated position of the electronic pen 14. For example, when the indicated position is detected at a central portion of the detection area formed by the touch sensor 18, the pen detection circuit 28 may set the threshold value smaller than that when the indicated position is detected at the periphery of the detection area.

Figure 15:
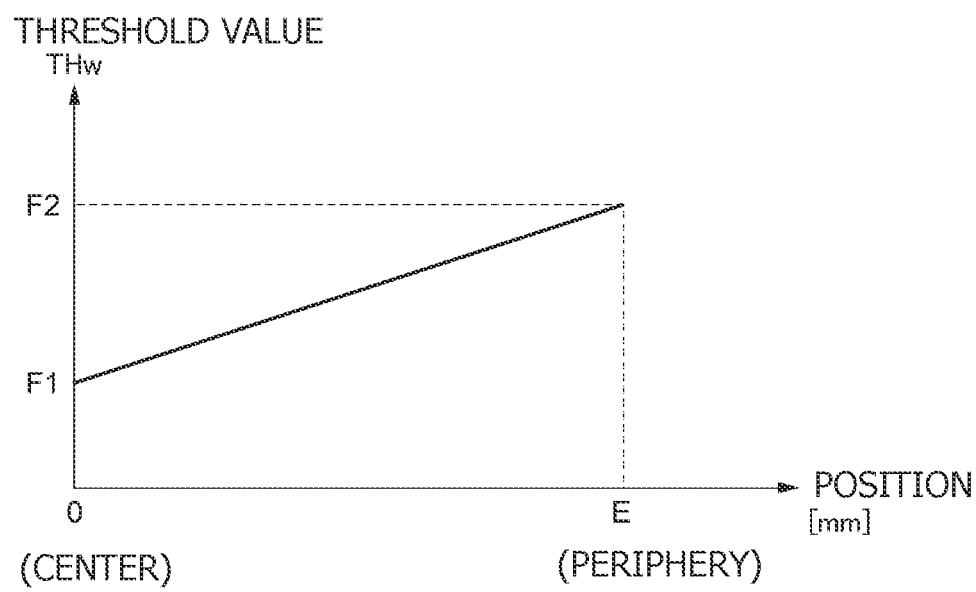
FIG. 15 is a diagram illustrating a second rule for setting the threshold value.

FIG. 15 is a diagram illustrating the second rule for setting the threshold value. The horizontal axis of the graph represents the indicated position (unit: mm) of the electronic pen 14, and the vertical axis of the graph indicates the threshold value THw. Position X=0 corresponds to the center of the detection area, and position X=E corresponds to the periphery of the detection area. At the center position (X=0) of the detection area, the threshold value is set to THw=F1. The threshold value THw is set so as to linearly increase from the central portion toward the peripheral portion. Then, at the edge position (X=E) of the detection area, the threshold value is set to THw=F2 (F1<F2).

According to the third example, detection can be performed taking into consideration the tendency of the amount of deformation of the touch sensor 18 to increase with the decreasing distance from the central portion of the detection area, and the tendency of the signal value to decrease accordingly.

Fourth Example

When determining that the touch sensor 18 is in the "overload" state, the pen detection circuit 28 of the touch IC 20 may set the threshold value to be used for threshold value processing according to the type of the electronic pen 14, the pen tip 14t, or the tablet terminal 12, or a combination of these types.

FIG. 16 is a diagram illustrating the third rule for setting the threshold value. To be more specific, this figure illustrates a table indicating the correspondence relation between article categories, types, and threshold values. The "article category" includes a device name (for example, electronic pen/tablet, etc.) or a component name (for example, pen tip, etc.). The "type" includes a manufacturer name, a product name, a model name, a standard name, a specification, etc. For example, a threshold value suitable for "an electronic pen of type X1" is set to THw=Th11.

According to the fourth example, detection can be performed in consideration of the fact that the degree of deformation of the touch sensor 18 or the shape of the signal distribution differs depending on the type of the electronic pen 14 or the type of the pen tip 14t. Further, according to the fourth example, detection can be performed taking into consideration the fact that the degree of deformation of the touch sensor 18 or the size of the gap G differs depending on the type of the tablet terminal 12.

Effects of Embodiment

As described above, the input system 10 includes the electronic pen 14 and an electronic device (here, the tablet terminal 12) used together with the electronic pen 14. The tablet terminal 12 includes the display panel 44 that displays images or videos, and the capacitive type touch sensor 18 having the plurality of sensor electrodes 18x and 18y and arranged separately from and above the display panel 44 so as to provide the gap G therebetween, and an integrated circuit (here, touch IC 20) that obtains a signal distribution correlated to the capacitance formed between the indicator approaching the touch sensor 18 (here, the electronic pen 14 or the finger 16) and the sensor electrodes 18x and 18y and performs signal processing on the signal distribution to detect the indicator. The touch IC 20 performs a detection (SP24) for detecting the indicator by performing signal processing on the signal distribution, and processing (SP18, SP20) for varying the signal processing depending on the detection result of the overload on the touch sensor 18.

As in the above configuration, by varying the signal processing depending on the detection result of the overload on the touch sensor 18, detection can be performed, in which the tendency of the signal distribution output from the touch sensor 18 to vary before and after the deformation of the touch sensor 18 is reflected. As a result, in a device configuration in which the capacitive type touch sensor 18 and the display panel 44 are arranged apart from each other so as to provide the gap, G, degradation in the detection accuracy of the indicator due to the deformation of the touch sensor 18 can be suppressed.

Further, in the case where the signal processing includes threshold value determination processing for detecting the presence or absence of the indicator or the indicated position on the basis of the magnitude relation between the signal value for each position indicated by the signal distribution and a threshold value, when an overload is detected, the touch IC 20 may make the threshold value smaller than that when an overload is not detected. When an overload is detected, the signal value is likely to decrease as the touch sensor 18 approaches or comes in contact with the surface of the display panel 44. Therefore, by relatively lowering the threshold value, the indicator can be detected more easily even when an overload occurs.

Further, when the indicator is the electronic pen 14 having the writing pressure sensor 60 that outputs a writing pressure value that is correlated with the writing pressure acting on the pen tip 14t, the touch IC 20 may determine that an overload has occurred if the writing pressure value supplied from the electronic pen 14 is in a saturated state. By utilizing the fact that the load acts on the pen tip 14t and the touch sensor 18 at the same time, an overload can be detected without actually measuring the load on the touch sensor 18.

Further, the touch IC 20 may acquire the writing pressure value from the electronic pen 14 through capacitive coupling type communication with the electronic pen 14. Alternatively, if the tablet terminal 12 further includes a communication circuit (here, the wireless module 30) that exchanges data with the electronic pen 14 through communication other than capacitive coupling type communication, the touch IC 20 may obtain the writing pressure value from the electronic pen 14 via the wireless module 30.

Further, when the tablet terminal 70 further includes the pressure sensor 72 provided on the display panel 44, the touch IC 20 may determine that an overload has occurred when the pressure sensor 72 detects pressure from the touch sensor 18. By utilizing the fact that pressure is applied to the surface of the display panel 44 upon contact with the touch sensor 18, an overload can be detected without actually measuring the load on the touch sensor 18.

Furthermore, the touch IC 20 may change the threshold value depending on the duration of the overload after the overload is detected. To be specific, the touch IC 20 may decrease the threshold value continuously or stepwise as the duration becomes longer. Thereby, detection can be performed taking into account the fact that the signal value tends to decrease as the duration of overload increases.

Furthermore, when an overload is detected, the touch IC 20 may change the threshold value depending on the position indicated by the indicator. To be specific, the touch IC 20 may set a threshold value smaller when the indicated position is detected at the central portion of the detection area formed by the touch sensor 18 than that when the indicated position is detected at the periphery of the detection area. Thereby, detection can be performed taking into account the fact that the amount of deformation of the touch sensor 18 increases with the decreasing distance from the central portion of the detection area and the signal value tends to decrease accordingly.

Furthermore, when an overload is detected, the touch IC 20 may change the threshold value depending on the type of the electronic pen 14 or the type of the pen tip 14t. Thereby, detection can be performed in consideration of the fact that the degree of deformation of the touch sensor 18 or the shape of the signal distribution differs depending on the type of the electronic pen 14 or the type of the pen tip 14t.

Also, the touch IC 20 may change the threshold value according to the type of the tablet terminal 12 when an overload is detected. Thereby, detection can be performed in consideration of the fact that the degree of deformation of the touch sensor 18 or the size of the gap G differs depending on the type of the tablet terminal 12.

MODIFICATIONS

Note that the present disclosure is not limited to the above-described embodiments, and it goes without saying that changes can be made freely without departing from the spirit of the disclosure. Alternatively, each configuration may be freely combined as long as no technical contradiction is caused.

In the embodiment described above, the case where the electronic pen 14 is detected by the pen detection circuit 28 has been described as an example, but the above processing method can also be applied to the case where the finger 16 is detected by the touch detection circuit 26. When the finger 16 is detected, if the pressure by the finger 16 cannot be measured, the device configuration illustrated in FIG. 13 is adopted.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device comprising:
a display panel that, in operation, displays an image or video;
a touch sensor of a capacitive type and having a plurality of sensor electrodes, wherein the touch sensor is arranged above the display panel separately with a gap between the touch sensor and the display panel; and
an integrated circuit that, in operation, acquires a signal distribution correlated with a capacitance formed between an indicator approaching the touch sensor and the sensor electrodes, and performs signal processing on the signal distribution to detect the indicator, wherein the integrated circuit, in operation, varies the signal processing according to a detection result of an overload on the touch sensor.

2. The electronic device according to claim 1, wherein:
the signal processing includes threshold value determination processing that detects presence or absence of the indicator, based on a magnitude relation between a signal value for each position indicated by the signal distribution and a threshold value, and
the integrated circuit, in operation, makes the threshold value smaller when the overload is detected than when the overload is not detected.

3. The electronic device according to claim 2, wherein:
the integrated circuit, in operation, changes the threshold value, based on a duration of the overload after the overload is detected.

4. The electronic device according to claim 3, wherein:
the integrated circuit, in operation, decreases the threshold value continuously or stepwise as the duration becomes longer.

5. The electronic device according to claim 2, wherein:
the integrated circuit, in operation, varies the threshold value, based on an indicated position indicated by the indicator when the overload is detected.

6. The electronic device according to claim 5, wherein:
the integrated circuit, in operation, decreases the threshold value when the indicated position is detected at a central portion of a detection area formed by the touch sensor, compared to when the indicated position is detected at a periphery of the detection area.

7. The electronic device according to claim 2, wherein:
the integrated circuit, in operation, varies the threshold value according to a type of the electronic device when the overload is detected.

8. The electronic device according to claim 1, wherein:
the indicator is an electronic pen having a writing pressure sensor that, in operation, outputs a writing pressure value correlated with a writing pressure acting on a pen tip, and
the integrated circuit, in operation, determines that the overload occurs when the writing pressure value supplied from the electronic pen is in a saturated state.

9. The electronic device according to claim 8, wherein:
the integrated circuit, in operation, acquires the writing pressure value from the electronic pen through capacitive coupling type communication with the electronic pen.

10. The electronic device according to claim 9, further comprising:
a communication circuit that, in operation, exchanges data with the electronic pen by communication different from the capacitive coupling type communication, wherein the integrated circuit, in operation, acquires the writing pressure value from the electronic pen via the communication circuit.

11. The electronic device according to claim 8, wherein:
the signal processing includes threshold value determination processing that detects presence or absence of the indicator, based on a magnitude relation between a signal value for each position indicated by the signal distribution and a threshold value, and
the integrated circuit, in operation, varies the threshold value according to a type of the electronic pen or a type of the pen tip when the overload is detected.

12. The electronic device according to claim 1, further comprising:
a pressure sensor provided on the display panel,
wherein the integrated circuit, in operation, determines that the overload occurs when the pressure sensor detects pressure from the touch sensor.

13. An integrated circuit integrated into an electronic device, the electronic device including a display panel that, in operation, displays an image or video, and a touch sensor of a capacitive type and having a plurality of sensor electrodes and arranged above the display panel separately with a gap between the touch sensor and the display panel, the integrated circuit comprising:
at least one processor; and
at least one memory storing instructions that, when executed by the at least one processor, cause the integrated circuit to:
detect an indicator by acquiring a signal distribution correlated with a capacitance formed between the indicator approaching the touch sensor and the sensor electrodes;
perform signal processing on the signal distribution; and vary the signal processing according to a detection result of an overload on the touch sensor.

14. An input system comprising:

an electronic pen; and an electronic device used together with the electronic pen, the electronic device including:
- a display panel that, in operation, displays an image or video,
- a touch sensor of a capacitive type and having a plurality of sensor electrodes, wherein the touch sensor is arranged above the display panel separately with a gap between the touch sensor and the display panel, and
- an integrated circuit that, in operation, acquires a signal distribution correlated with a capacitance formed between an electronic pen approaching the touch sensor and the sensor electrodes, and performs signal processing on the signal distribution to detect the electronic pen, wherein the integrated circuit varies, in operation, the signal processing according to a detection result of an overload on the touch sensor.

* * * * *